Nov. 25, 1952  E. C. HOFFMAN  2,619,147
TIRE TREAD LINER
Filed Jan. 8, 1949  2 SHEETS—SHEET 1

INVENTOR.
Edmund C. Hoffman
BY
Wilfred D. Stone
Atty.

Nov. 25, 1952   E. C. HOFFMAN   2,619,147
TIRE TREAD LINER
Filed Jan. 8, 1949                     2 SHEETS—SHEET 2
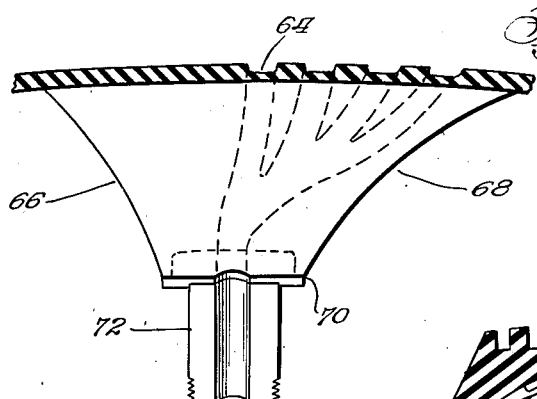
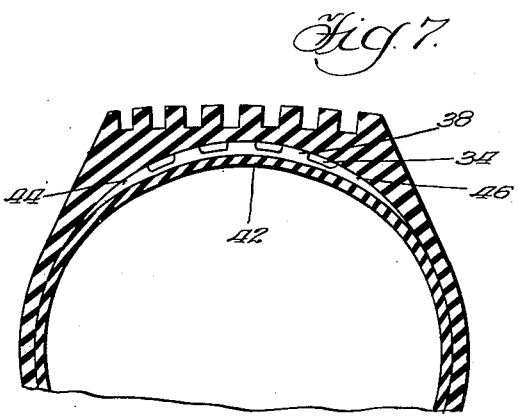
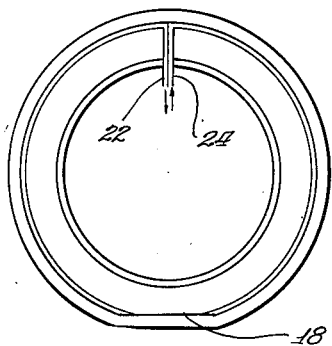
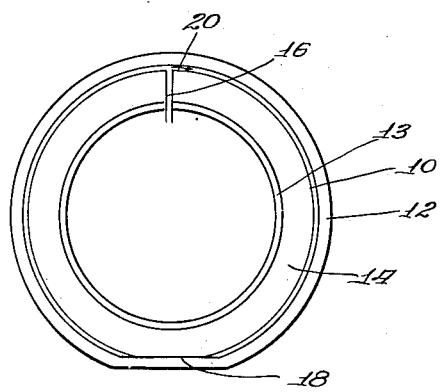
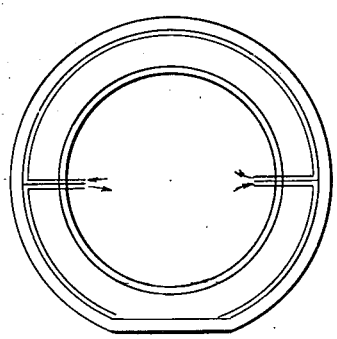
INVENTOR.
Edmund C. Hoffman Patented Nov. 25, 1952

2,619,147

UNITED STATES PATENT OFFICE 2,619,147

TIRE TREAD LINER

Edmund C. Hoffman, Chicago, Ill.

Application January 8, 1949, Serial No. 69,950

14 Claims. (Cl. 152—153)

This invention relates to a tread liner for a tire casing, and particularly to one having air passageways for cooling the tread and the tube.

In the development of the automobile tire it was early recognized that blowouts resulted from a rising pressure of air in the tire which stemmed from overheating the tire. It was further recognized that the circulation of fresh air inside a tire during operation would remove substantial amounts of heat, and casing and tubular liners having air duct systems in them were designed. In some designs, the air was passed through ports in the casing wall, and in others the air was led from either the casing or the liner down to the rim and withdrawn through a hole through the rim. Despite these designs, the automobile tire has developed as a solid casing and a smooth surface tube fitting inside the casing. Moreover, automobile manufacturers make the rim with a single hole in it, usually about three-fourths of an inch in diameter. The result is that today any attempt to circulate fresh air in a tire must be based on the continued use of a standard tire casing, a standard tube, and a single hole in the rim.

The first object of this invention is to provide a tread liner that will permit the circulation of air between the inside of the tread of a standard casing and the standard tube and to circulate the air to the tread liner through a standard valve stem opening in a rim. The valve stem opening is about three-fourths of an inch in diameter and the valve stem itself is about three-eighths of an inch in diameter. One of the features of applicant's invention is the provision of one or more annular passageways that seat over the valve stem and inside the rim hole. The dimensions are small but it is not anticipated that there will be difficulty in inducing an automobile owner to ream out the valve stem hole to provide a one-inch valve hole should this prove desirable.

The second object of this invention is to positively circulate fresh air in the liner by providing a circulatory system therein and by utilizing the squeezing of the liner between the tube and the casing at the points where the tread engages the road to circulate the air. One of the features of applicant's invention is the provision of a series of air ducts in the casing which ducts form part of an air line having an inlet and an outlet. Both the inlet and the outlet are separately vented to air. Referring to Fig. 8, assuming that 10 is an air passageway with air therein at atmospheric pressure, 12 a casing tread, 13 a rim, and 14 a tube under pressure, and assuming that there is a single air passageway 16 from the passageway 10 to atmosphere, the squeezing of air passageway 10 at 18 will cause air in the duct 10 to simply circulate around past the port 16 as indicated by the arrow 20. There may be a slight interchange from the outside into the tube 10 but generally speaking, the air tube 10 will become as hot as the casing and will not cool it appreciably. Applicant's invention is illustrated in Figure 9. Here the duct 10 is connected at one end to a port 22 and at the other end to the port 24, and assuming that the wheel is moving to the left, as the squeezing takes place at the point 18, the air will be forced out the tube 22 while additional air will be sucked in by the port 24. A variation of this idea is illustrated in Figure 10, where applicant employs two sets of ports. Depending upon the degree of squeezing between the liner and the casing, applicant will establish a sucking in and a pushing out of air through his air circulating system.

Another object is to keep the tread liner centered on the inside surface of the tread. Applicant's liner is a tread liner, it does not extend downwardly along the inner side walls of the casing because he does not wish to alter materially the volumetric content of the inside of the casing. Hence, he has the problem of keeping the liner from shifting sideways of the casing. He attains this end by the use of two side tongues which carry the air down to the valve stem and which are of fairly stiff and sturdy construction. Each tongue has fitted to its lower end a half collar for inserting in the rim hole around the valve stem and this holds the tread firmly in position at the point diametrically opposite to the valve stem. As presently conceived, it will not be necessary to have more than one set of tongues, but experience may indicate that an additional pair are necessary and these may be provided.

In carrying out his invention, applicant uses what is called in the trade "cool rubber" for his liner. He utilizes a rubber hardness wherein the size of the grooves will be greater when the pressure from the tube is thirty pounds per square inch against the inside wall of the casing than the volume would be when the tube plus the weight of the car on the particular wheel between the tube and that portion of the tread engage the road.

These and such other objects as may hereinafter appear are attained in the embodiment of the invention illlustrated in the accompanying drawings wherein:

Fig. 6 is an inside view of a portion of one of the tongue portions of applicant's tread liner;

Fig. 7 is a view in section of applicant's liner taken on the line 7—7 of Fig. 1 but positioned between a casing tread and an inner tube; and, Figs. 8, 9 and 10 are schematic illustrations comparing applicant's circulatory system with both an inlet and an outlet with a system having but one opening.

Figure 1:
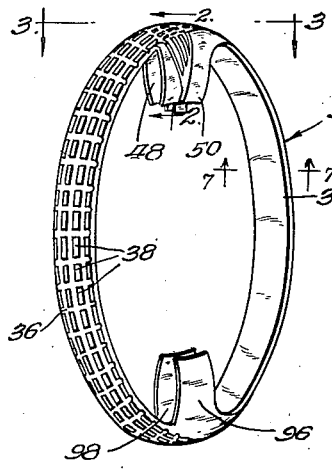
Fig. 1 is a perspective view of applicant's tread liner.

Continuing to refer to the drawings, the numeral 30 in Fig. 1 identifies applicant's tread liner which comprises a seamless band having a smooth inside surface 32 and a plurality of grooves at its outer surface 34 running parallel circumferentially of the band and transverse grooves 36 intercepting the grooves 34. The grooves are formed by lands 38. The relative cross sections of the lands and the grooves is shown in Fig. 7. The grooves are of such a size and the thickness of the liner is such that an increase in pressure between the casing tread 40 and the tube 42 will reduce the volumetric content of the grooves. Continuing to refer to Fig. 7, the side edges 44 and 46 of the liner taper down to a very thin edge so that the line of juncture between the tube and the inside of the casing wall will be smooth and thereby avoid any pinching of the tube.

Figure 3:
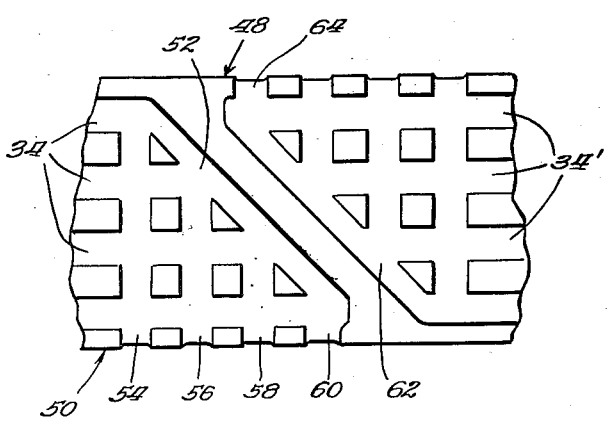
Fig. 3 is an outside view of applicant's tread liner taken on the line 3—3 of Fig. 1.

Returning to Fig. 1, a pair of casing liner tongues 48 and 50 are formed integrally with the side edges of the tread liner 30 and are oppositely disposed with respect to each other. These tread liner tongues are indicated in Fig. 3 where it is seen that the circumferential grooves 34 enter a gathering channel 52 which lead to the channels or grooves 54, 56, 58 and 60 in the outer surface of the tongue 50. The other ends of these same circumferential grooves designated by the number 34' enter a gathering channel 62 and in turn lead into surface grooves in the tongue 48. When a tire is inflated with the liner in position, air in the gathering channel 52 cannot pass over into the gathering channel 62. The groove 58 in the tongue 50 is in transverse alignment with the groove 64 in the tongue 48.

Figure 2:
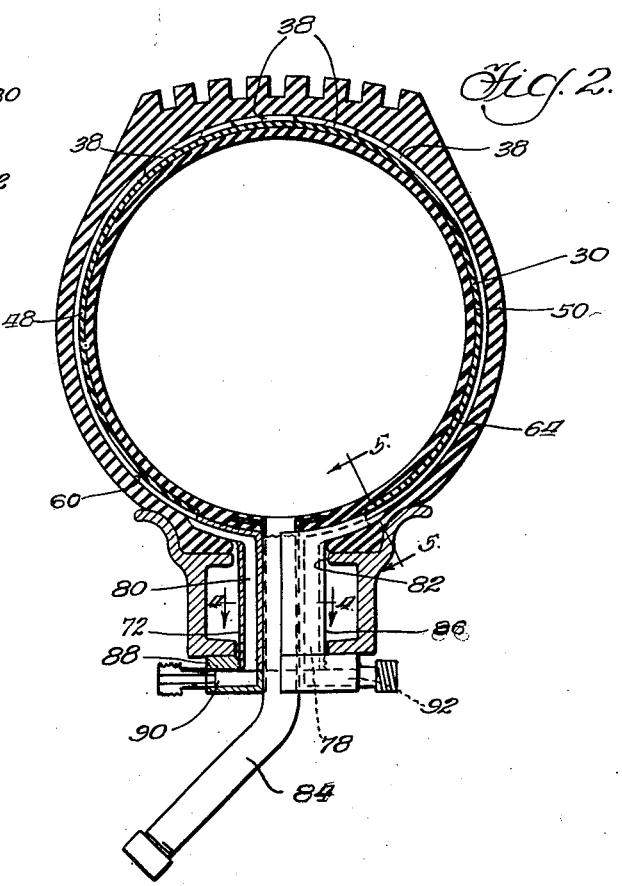
Fig. 2 is a view partly is section and partly in elevation of applicant's tire liner taken on the line 2—2 but positioned inside a casing and with an inflated tube therein.
Figure 4:
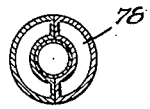
Fig. 4 is a view taken on the line 4—4 of Fig. 2.
Figure 5:
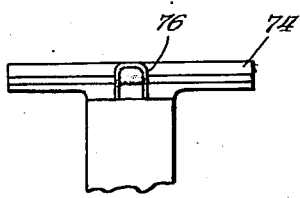
Fig. 5 is a view taken on the line 5—5 of Fig. 2.

Referring now to Fig. 6, which is an enlarged perspective view of the inside of the tongue 48, the tongue has tapering edges 66 and 68 which terminate at a reduced heavier portion 70 in which is molded a collar duct 72. This collar duct, referring to Figs. 2 and 5, has a top flashing 74 beneath the side of which is an inverted U-shaped cross sectional passageway 76, which passageway opens into a semi-annular passageway 78 in the collar. Two tongues with their collars assembled as illustrated in Fig. 2 may be fitted into the hole in the rim 82 leaving room for insertion of the valve stem 84. The semi-circular bottom outside surface of the two collars 72 and 86 is externally threaded to receive a cap 88 which has two oppositely directed ports 90 and 92 which ports are in communication with the passageways 78 and 80. The cap 88 holds the two collars in assembled relationship with the casing and rim. The passageway 76 is vulcanized into alignment with the groove or passageway 60.

From the foregoing, it will be seen that air entering the passageway 90 in Fig. 2 will move up passageway 64, and thence referring to Fig. 3, into the collection channel 62 and thence into the grooves of the liner. It will move around the tire into the collection groove 52, thence into the groove 58, and referring again to Fig. 2, into the passageway 78 and out the passageway 92. Applicant has provided, therefore, an air line from the port 90 to the port 92.

Referring to Fig. 2, the opening 82, which constitutes the hole in the rim, is shown enlarged. Most of these holes are about from five-eighths to three-fourths of an inch in diameter, but for experimental purposes, applicant reamed the hole larger. Applicant believes that when he has properly related the size of the grooves to the size of the lands and has reduced the thickness of the walls of the collars 72 and 86 to a minimum, that the semi-annular space in each collar will be sufficient to accommodate the flow of the air even though the outside radius of the collar is only five-eighths of an inch.

The port 90 and 92 are oppositely directed and as shown are directed parallel to the axle carrying the rim. Applicant believes that the squeezing of the liner between the tube and that portion of the tread adjacent to the ground will be sufficient to provide a steady flow of air through the liner, and if this is correct, it is desirable to minimize the action of any outside air upon the orifices of the passageways 90 and 92. He has considered directing one orifice forwardly and the other rearwardly and it may be found that this will further assist circulation of air. The ports 90 and 92 have a diameter to receive a compressed air coupling so that applicant may blow out the liner and clean it.

Experience may show that one or even more pairs of tongues may be needed to hold the liner firmly in position, and two additional tongues 96 and 98 are indicated in Fig. 1. These tongues do not carry air grooves and consequently are not part of the air circulating system. As suggested in a schematic diagram in Fig. 10, applicant may employ two air circulatory systems, utilizing two sets of delivery ducts necessitating the drilling of an additional hole in the rim. Where such a system is employed, the tongues 96 and 98, see Fig. 1, will be similar to tongues 48 and 50, that is, tongues 96 and 98 will have the air grooves in their outer surfaces and each will have a metallic port connecting the air grooves to a point inside the rim.

The configuration of the grooves on the outer surface of the tread liner is not deemed important. The transverse grooves may be diagonal and the circumferential grooves may be sinuous.

Applicant believes that taking the air from the liner through the standard rim hole by means of an annular channel inlet simplifies the structure and promotes its sale. He is experimenting with a liner of the type illustrated, where, however, the air circulatory system does not have an inlet and an outlet. The circulatory system has one opening through a passageway around the valve stem.

Having thus described my invention, what I claim is:

1. A tread liner for a pneumatic tire comprising a band of compressible material, an air passageway extending circumferentially of the band and having an inlet and an outlet, a pair of tongues each extending laterally from said liner, and a passageway in each tongue connecting respectively the inlet and the outlet to the extremities of the tongues.

2. A tread liner for a pneumatic tire comprising a band of compressible material, an air passageway extending circumferentially of the band for approximately 90° of arc or more and having an inlet at one end of the passageway and an outlet at the other end thereof, a duct connected to the inlet and extending laterally from one edge of the liner for insertion through an opening in a tire rim, and a second duct connected to the outlet and extending from the opposite edge of the liner for insertion through the same opening.

3. A tread liner for a pneumatic tire comprising a band of compressible material, an air passageway extending circumferentially of the band and having an inlet and an outlet, a pair of tongues each extending laterally from said liner, a passageway in each tongue connecting respectively the inlet and the outlet to the extremities of the tongues, and a duct connected to the outer end of each tongue passageway for insertion through an opening in the tire rim.

4. A tread liner for a pneumatic tire comprising a band of compressible material, an air passageway extending circumferentially of the band and having an inlet and an outlet, a pair of transversely aligned tongues extending respectively from opposite side edges of the liner, a passageway connecting the inlet to the outer end of one tongue, a passageway connecting the outlet to the outer end of the other tongue, and a duct connected to the other end of each tongue passageway for insertion through a valve stem opening of a tire rim.

5. A tread liner comprising a band of compressible material, an air passageway extending circumferentially of the band, and a duct having one end attached to the liner in communication with the air passageway and having the other end of a size such that it may be inserted between a valve stem and a valve stem hole in a tire rim.

6. A tread liner comprising a band of compressible material, an air passageway extending circumferentially of the band, a tongue extending laterally from a side of the liner, a passageway in the tongue connecting the liner passageway to the outer end of the tongue, and a duct having one end attached to the liner in communication with its passageway and having a size such that it may be inserted between a valve stem and a valve stem hole in a tire rim.

7. A tread liner comprising a band having circumferential air passageways, a tongue attached to the band and having an air passageway in communication with the band passageway, and a metal duct having an arcuate cross section with one end in communication with the air passageway, the outer edge of said duct being seatable in a valve stem hole of a tire rim and an inner edge in which may be seated a valve stem.

8. A tread liner comprising a band of compressible material, an air passageway extending circumferentially of the band and having an inlet and an outlet, a pair of transversely aligned tongues each extending laterally from opposite edges of said liner, a passageway in each tongue in communication respectively with the inlet and the outlet of the liner passageway, and a duct, having a semi-annular cross section seatable in a tire rim valve stem hole, attached to each tongue and in communication with its passageway.

9. A tread liner comprising a band of compressible material with transversely aligned flaps extending from opposite edges thereof, the flaps having a length such that their ends will meet when positioned adjacent the inside of a tire casing, grooves in the outer surface of the band extending from a point adjacent the tongues circumferentially to a point spaced from the first point, a collection groove connecting the first ends of the band grooves to the outer end of one tongue, a second collection groove connecting the other ends of the band grooves to the outer end of the second tongue, and a duct attached to each tongue in communication with its groove for insertion through a tire rim hole.

10. A tread liner comprising a band of compressible material with transversely aligned flaps extending from opposite edges thereof, the flaps having a length such that their ends will meet when positioned adjacent the inside of a tire casing, grooves in the outer surface of the band extending from a point adjacent the tongues circumferentially to a point spaced from the first point, a collection groove connecting the first ends of the band grooves to the outer end of one tongue, a second collection groove connecting the other ends of the band grooves to the outer end of the second tongue, and a duct, having a semi-annular cross section seatable in a tire rim valve stem hole, attached to each tongue in communication with its groove for insertion around a valve stem through a tire rim valve stem hole.

11. The tread liner of claim 10 together with a coupling for a standard compressed air hose on the outer end of each duct.

12. In combination with a tire and a pneumatic tube, a tread liner having circumferential air passageways, a tongue extending from one side of said liner around the tube to a point adjacent the tube valve stem, a passageway in the tongue communicating with the liner passageway and extending down to the valve stem, and a rigid duct communicating with the tongue passageway and insertable between the valve stem and the wall of a valve stem hole in a rim.

13. A vehicle pneumatic tire comprising a casing, an inner tube having a valve stem in said casing, an air passageway extending circumferentially of the tire between the inside of the casing and the outside of the tube, a duct connected to one end of the passageway and extending adjacent the valve stem and out to atmosphere, and a second duct connected to the other end of the passageway and extending adjacent the valve stem and out to atmosphere, the passageway having no other vents to atmosphere, whereby as that portion of the tire containing the passageway is progressively compressed on a road, air will be forced out one duct and drawn in through the other duct.

14. A vehicle pneumatic tire comprising a casing, an inner tube having a valve stem in said casing, a closed band between the casing and the tube, an air passageway extending substantially circumferentially of the band and having two ends which are not otherwise in communication with each other, a duct connected to one end of the passageway and extending adjacent the valve stem and out to atmosphere, and a second duct connected to the other end of the passageway and extending adjacent the valve stem and out to atmosphere, the passageway having no other vents to atmosphere, whereby as that portion of the tire containing the passageway is progressively compressed on a road, air will be forced out one duct and drawn in through the other duct.

EDMUND C. HOFFMAN.

REFERENCES CITED

The following references are of record in the file of this patent:

UNITED STATES PATENTS

| Number | Name | Date |
| --- | --- | --- |
| 2,041,534 | Eger | May 19, 1936 |

FOREIGN PATENTS

| Number | Country | Date |
| --- | --- | --- |
| 193,351 | Great Britain | Feb. 22, 1923 |
| 405,927 | Great Britain | Feb. 15, 1934 |
| 374,794 | France | June 22, 1907 |
| 729,551 | France | July 26, 1932 |